H. E. WOOLERY.
DRIVING MECHANISM.
APPLICATION FILED AUG. 27, 1920.

1,400,200.

Patented Dec. 13, 1921.

Inventor
HORACE E. WOOLERY
By his Attorney
W. E. Thompson

UNITED STATES PATENT OFFICE.

HORACE E. WOOLERY, OF ST. PAUL, MINNESOTA.

DRIVING MECHANISM.

1,400,200. Specification of Letters Patent. Patented Dec. 13, 1921.

Application filed August 27, 1920. Serial No. 406,515.

*To all whom it may concern:*

Be it known that I, HORACE E. WOOLERY, a citizen of the United States, residing at St. Paul, Ramsey county, Minnesota, have invented a Driving Mechanism, of which the following is a specification.

My invention relates to improvements in the mechanism for transmitting power from a free running engine to railway motor cars as a means of driving such cars over the rails of any railway line.

My objects are first, to provide a transmission that may be operated quickly to release the drive belt without materially changing the tension on the driving chain; second, to provide one that will work equally well in forward or reverse movements; third, to utilize the largest possible percentage of the engine power to secure the proper speed of the car without producing undue wear on the journals of the engine and without putting an over strain on the drive belt; fourth, to so construct it that the car may be stopped without stopping the engine.

Figure 2:
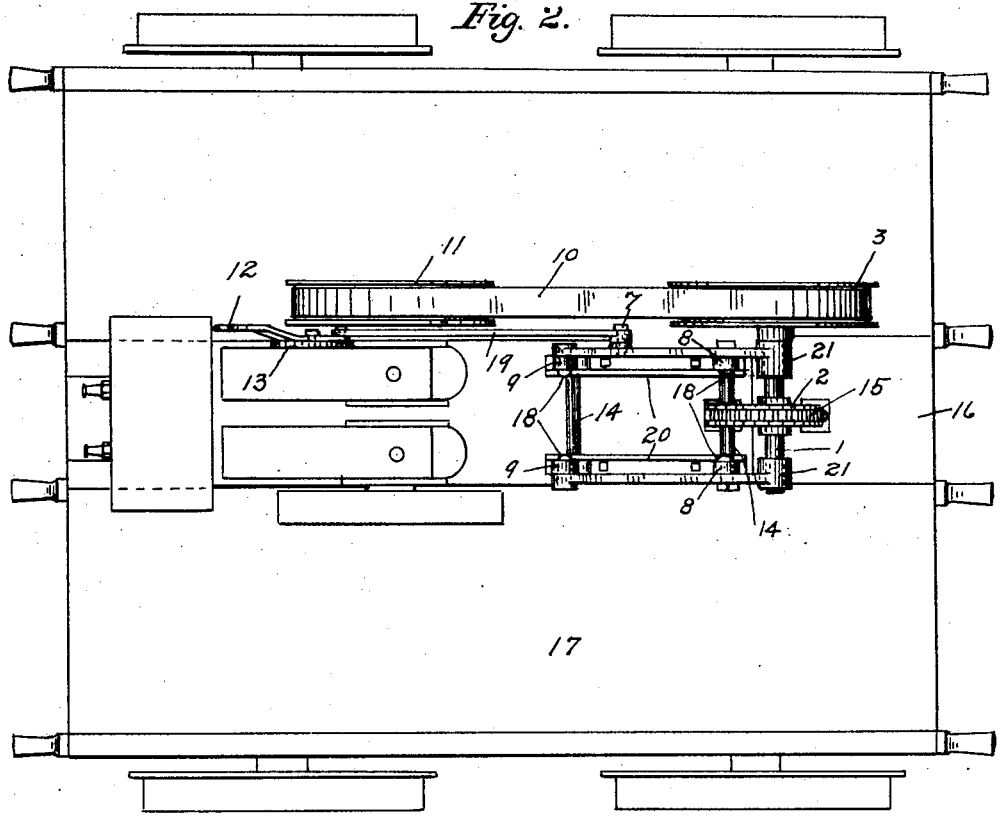
Figure 1:
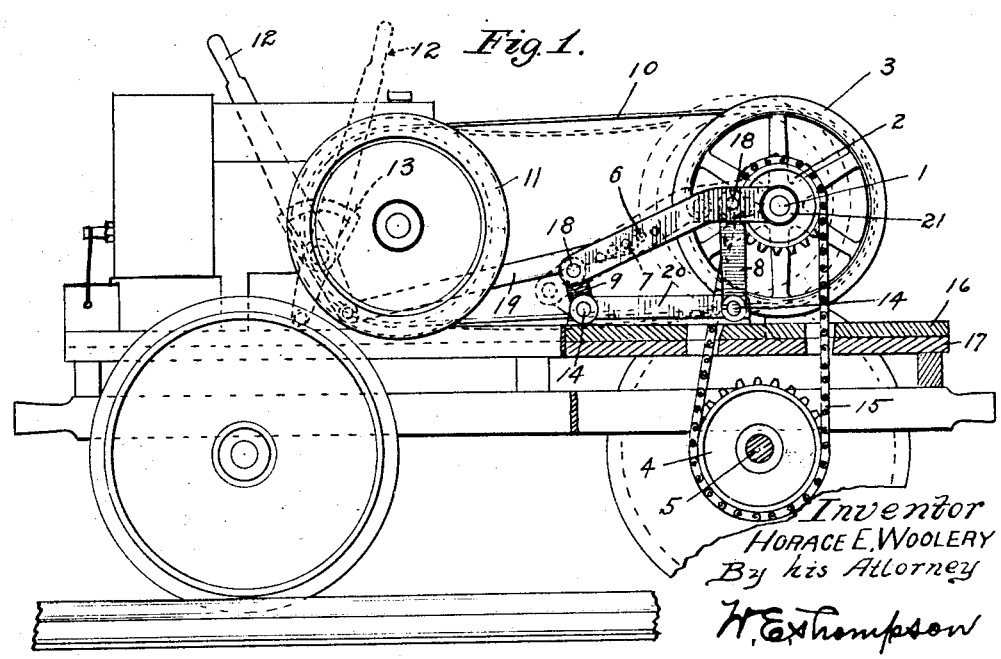

An embodiment of my invention is illustrated in the accompanying drawings, in which Figure 1 is a side elevation, partly in section, and Fig. 2 is a top plan view, showing my improved transmission.

I accomplish these objects by mounting my transmission with my engine on the same plank which in turn is bolted to the floor of the car. Figs. 1 and 2 give the two views I deem necessary to show its operation, like numerals designating like parts throughout. In my transmission I use a movable counter shaft 1, mounted to revolve in its journal bearings 21 and also capable of a forward and backward movement as the transmission arms 6 are so moved by the control lever 12 and its connecting link 19. On one end of the counter shaft 1 I mount a double flanged metal pulley 3 and at about the center of the length of the counter shaft 1 I securely fasten a sprocket wheel 2. I attach to the counter shaft 1 two metal arms made either in split or solid form, calling them transmission arms 6, the connections 21 being in journal form; these transmission arms 6 I support by two pairs of rocker arms 8 and 9; the pair of rocker arms 9 I make about three inches long and secure them in actuating position furtherest from the counter shaft 1. The other pair of rocker arms 8 I make about seven inches long, securing them in corresponding actuating position at about three inches from the counter shaft 1; for connections between the rocker arms 8 and 9 and the transmission arms 6 I use machine bolts 18 with heads and nuts, the holes in the connected parts being slightly larger than the bolts to allow of free movement of parts. These rocker arms 8 and 9 are rigidly attached at their lower ends to the ends of two rocker shafts 14, the short rocker arms 9 to one rocker shaft 14 and the long rocker arms 8 are attached to the other rocker shaft 14. Both rocker shafts 14 are spaced and held apart in proper position by suitable metal bases 20, which form the supports for said rocker shafts 14 and said rocker arms 8 and 9; these two bases 20 are secured to the plank 16, on which the transmission and engine are mounted, by bolts or other suitable means. I use a car axle sprocket wheel 4 which I fasten securely to the car axle 5 by any suitable means, supplying a roller chain 15 which I use as a drive chain for the transmission, passing it over the counter shaft sprocket 2 then through a hole in the plank 16 and car floor 17 and over the car axle sprocket 4, the axle sprocket 4 of course being the larger of the two sprockets. I provide means of adjustment for the axle sprocket 4 to keep it true running. I mount a double flanged metal pulley 11 on the engine in lieu of the ordinary fly wheel, provide a four inch drive belt of any suitable material, passing it over the engine pulley 11 and the counter shaft pulley 3. I mount a control lever 12 on the engine at a convenient point, using it with an ordinary quadrant 13, over the teeth of which the latch or dog of the control lever 12 passes at the will of the operator as said control lever 12 is moved to loosen or tighten the tension on the drive belt 10. For a connecting link 19 from the control lever 12 to the transmission arms 6 I use an ordinary half inch gas pipe with a suitable eye formed on each end to allow of proper connections for which I use studs with bushings 7, but other means may be used. I provide a row of holes in the transmission arms 6 at the connecting point of this link 19 for adjustment. By positioning the control lever 12 as I do with the fulcrum at about six inches from its lower end and constructing the transmission arms 6 in the shapes shown and the rocker arms 8 and 9 in the given lengths and locating the upper connections 18 between the rocker arms 9 and the transmission arms 6 in the same horizontal plane with the counter shaft 1, I am able to secure a forward and backward movement of the counter shaft 1 through an arc without materially releasing the tension on the roller chain 15. By this arrangement I am able to secure as great a movement as five inches forward and backward of the counter shaft 1 without changing said chain tension materially.

I show two positions of the transmission parts in Fig. 1, one in dotted lines to show the relative position of parts when the belt 10 tension is slackened to permit of the car being stopped while the engine may still be kept running and at the same time not materially disturbing the tension on the chain 15; the action of the transmission is such that when the control lever 12 is moved to its position indicated by the solid lines the connecting link 19 forces the transmission arms 6 with the attached and combined parts away from the engine pulley 11 thus tightening the tension on the drive belt 10 thereby applying the engine power to the counter shaft pulley 3 which drives the counter shaft 1 with its driving sprocket 2, in making which movement the counter shaft 1 passes through a small arc of a circle. A movement of the control lever 12 in the opposite direction will loosen the tension on the drive belt 10 thereby withdrawing the power from the counter shaft pulley 3 as said counter shaft 1 with its accessories approaches nearer to the engine, moving the reverse way through this same arc of travel. By limiting this travel I am able to maintain the proper tension on the roller drive chain 15 and still change the length of the belt 10 or even remove it.

I therefore claim:

1. A drive mechanism comprising a driving member, a driven member, a pivoted frame intermediate said driving member and driven member, comprising linkage, a shaft carried by said pivoted frame, and operative connections between said driving member and shaft, and between said shaft and driven member, and means for moving said frame to tighten or loosen the operative connection between said shaft and driving member while maintaining said shaft at a substantially constant distance from said driven member.

2. A drive mechanism comprising a support, a driving member mounted on said support, a driven member below said support, and an intermediate frame mounted on said support comprising upright pivoted links, cross bars connecting said links at their outer ends, a shaft carried by said cross bars, operative connections between said driving member and shaft, and between said shaft and driven member, and means for moving said frame toward and from said driving member to tighten or loosen the operative connection between said shaft and driving member, while maintaining said shaft at a substantially constant distance from said driven member.

HORACE E. WOOLERY.